United States Patent
Gibson et al.

(10) Patent No.: US 8,677,071 B2
(45) Date of Patent: Mar. 18, 2014

(54) CONTROL OF PROCESSOR CACHE MEMORY OCCUPANCY

(75) Inventors: Gary Allen Gibson, San Diego, CA (US); Valeri Popescu, Rancho Santa Fe, CA (US)

(73) Assignee: Virtualmetrix, Inc., Rancho Santa Fe, CA (US)

( * ) Notice: Subject to any disclaimer, the term of this patent is extended or adjusted under 35 U.S.C. 154(b) by 348 days.

(21) Appl. No.: 13/072,529

(22) Filed: Mar. 25, 2011

(65) Prior Publication Data

US 2011/0238919 A1    Sep. 29, 2011

Related U.S. Application Data

(60) Provisional application No. 61/341,069, filed on Mar. 26, 2010.

(51) Int. Cl.
*G06F 12/00* (2006.01)
*G06F 13/00* (2006.01)

(52) U.S. Cl.
USPC ........... 711/133; 711/100; 711/118; 711/134; 711/135; 711/136; 711/154; 711/159

(58) Field of Classification Search
USPC ......... 711/133, 100, 118, 134, 135, 136, 154, 711/159
See application file for complete search history.

(56) References Cited

U.S. PATENT DOCUMENTS

| | | | |
|---|---|---|---|
| 4,980,857 A | 12/1990 | Walter et al. | |
| 5,943,691 A * | 8/1999 | Wallace et al. | 711/172 |
| 6,671,762 B1 | 12/2003 | Soni et al. | |
| 6,845,456 B1 | 1/2005 | Menezes et al. | |
| 7,228,355 B2 | 6/2007 | Dowling | |
| 7,228,546 B1 | 6/2007 | McCarthy et al. | |
| 7,281,145 B2 | 10/2007 | Merkin et al. | |
| 7,386,586 B1 | 6/2008 | Headley et al. | |
| 7,539,994 B2 | 5/2009 | McAlinden et al. | |
| 2002/0184292 A1 | 12/2002 | Lal | |
| 2002/0188691 A1 | 12/2002 | Ignatius et al. | |
| 2004/0073905 A1 | 4/2004 | Emer et al. | |

(Continued)

FOREIGN PATENT DOCUMENTS

| | | |
|---|---|---|
| EP | 1501013 A2 | 1/2005 |
| JP | 7253893 A | 10/1995 |

(Continued)

OTHER PUBLICATIONS

Bjorn Anderson, "Static-priority scheduling on multiprocessors", 2003, Department of Computer Engineering, Chamlers University of Technology.

(Continued)

*Primary Examiner* — Midys Rojas
(74) *Attorney, Agent, or Firm* — Mintz, Levin, Cohn, Ferris, Glovsky and Pope, P.C.

(57) ABSTRACT

Techniques are described for controlling processor cache memory within a processor system. Cache occupancy values for each of a plurality of entities executing the processor system can be calculated. A cache replacement algorithm uses the cache occupancy values when making subsequent cache line replacement decisions. In some variations, entities can have occupancy profiles specifying a maximum cache quota and/or a minimum cache quota which can be adjusted to achieve desired performance criteria. Related methods, systems, and articles are also described.

43 Claims, 2 Drawing Sheets

(56) References Cited

U.S. PATENT DOCUMENTS

| | | |
|---|---|---|
| 2004/0244000 A1 | 12/2004 | Frank et al. |
| 2005/0091654 A1 | 4/2005 | Lection et al. |
| 2005/0132238 A1 | 6/2005 | Nanja |
| 2005/0198636 A1 | 9/2005 | Barsness et al. |
| 2005/0240752 A1 | 10/2005 | Yokoi et al. |
| 2007/0074207 A1 | 3/2007 | Bates et al. |
| 2007/0094661 A1 | 4/2007 | Baird et al. |
| 2007/0110094 A1 | 5/2007 | Tobita et al. |
| 2007/0234091 A1 | 10/2007 | Vishin et al. |
| 2009/0007114 A1 | 1/2009 | Riddick |
| 2009/0055829 A1 | 2/2009 | Gibson |
| 2010/0091786 A1 | 4/2010 | Liu et al. |
| 2010/0131791 A1 | 5/2010 | Kimura |
| 2011/0072218 A1* | 3/2011 | Manne et al. ............. 711/136 |

FOREIGN PATENT DOCUMENTS

| | | |
|---|---|---|
| JP | 2003131892 A | 5/2003 |
| WO | WO-0038033 A2 | 6/2000 |
| WO | WO-2008139685 A1 | 11/2008 |

OTHER PUBLICATIONS

International Search Report and Written Opinion dated Feb. 27, 2009 for PCT/US2008/074122.

Bensaou ("Credit-based fair queuing (CBFQ): A simple service-scheduling Algorithm for packet-switched Networks", IEEE, 2001, pp. 591-604).

International Search Report and Written Opinion dated Nov. 30, 2011,for International Application No. PCT/US2011/030096.

Choi, Kihwan et al. "Dynamic Voltage and Frequency Scaling based on Workload Decomposition." *Proceedings of the 2004 International Symposium on Low Power Electronics and Design* . ISLEP'04. Newport Beach, CA. Aug. 9-11, 2004. New York, NY:ACM. US. Aug. 9, 2004, pp. 174-179.

Pillai, Padmanabhan and Shin, Kang G. "Real-Time Dynamic Voltage Scaling for Low-Power Embedded Operating Systems." *Proceedings of the eighteenth ACM symposium on Operating Systems Principles* . SOSP '01. New York, NY. Jan. 1, 2001. pp. 89-102.

\* cited by examiner

CONTROL OF PROCESSOR CACHE MEMORY OCCUPANCY

CROSS REFERENCE TO RELATED APPLICATION

The present application claims priority under 35 U.S.C. §119 to U.S. Provisional Application Ser. No. 61/341,069, filed Mar. 26, 2010, entitled "METHOD AND APPARATUS FOR THE CONTROL OF PROCESSOR CACHE MEMORY OCCUPANCY", the disclosure of which is incorporated herein by reference.

TECHNICAL FIELD

The subject matter described herein relates to systems, techniques, and articles for allocating cache space to entities based on their corresponding performance requirements.

BACKGROUND

The presence/absence of instructions and data in a processor cache memory has a significant impact on the processor performance. With main memory being 100 (and more) clocks "away" from the processor, the execution speed decreases dramatically if data/instructions have to be fetched from there. This arrangement creates a challenge for real-time applications that have to guarantee a certain response time to a triggering event. Most conventional cache designs employ a structure called "set associative", meaning there are multiple cache locations available for a certain cache address. If two memory accesses alias/reference the same location in cache, multiple data items can be stored in alternate locations (sets), otherwise the later data will vacate and occupy the space of the first data. If there are several sets (e.g., 4 or 8), and all locations are occupied, a determination must be made as to which space is to be vacated to make room for a new data.

The "vacating" (replacement) policies often used are referred to as Random and Least Recently Used (LRU). With the Random method, the cache location to be vacated is selected randomly while with the LRU method, the location containing data that has been least recently accessed is vacated making the assumption that the data least recently accessed is of less importance.

Both methods fail to guarantee response time. Even if, in the case of LRU, if certain data is rarely used and statistically has less impact on performance, for a particular application, this can offer no performance "comfort". In the case of hard real-time software (i.e., software in which failing to meet timing has serious consequences on system behavior, etc.), programmers use the method of reserving (locking) a portion of the cache and then re-arranging the code to ensure all critical data will permanently reside in the reserved area. This method certainly guarantees response time but at the expense of potentially "permanently" crippling the performance of other resident software.

Because of ever increasing processor speeds and with the proliferation of multi-core implementations, caches are growing in size. With more space available and more software running, the need to "police" the cache space allocation is obvious. The traditional LRU and Random methods have provided adequate performance in the past but they are unable to keep up with the evolution of processors.

SUMMARY

In one aspect, methods and systems for controlling processor cache memory within a processor are provided. A cache occupancy value is calculated for each of a plurality of entities executing in the processor system, a cache occupancy value for the entity based on associated entity identifiers. A cache replacement algorithm uses the occupancy values to determine which cache lines in the cache memory to replace when vacating entities.

The occupancy value can be calculated by repeatedly counting a number of cache lines allocated to the entity offset by a number of cache lines vacated for the entity. In some situations, cache lines can be shared by multiple entities and techniques such as first to access can be used to determine to which entity the cache line is associated. The entities can be one or more of: a single task, a group of tasks, a thread, a group of threads, a single state machine, a group of state machines, a single virtual machine, and a group of virtual machines, or any combination thereof.

Each entity can have an associated occupancy profile. The occupancy profile can include a minimum quota specifying a minimum number of cache lines the corresponding entity should occupy. The occupancy profile can include a maximum quota specifying a maximum number of cache lines the corresponding entity should occupy. Performance of at least one of the entities by the processor system can be monitored (e.g., cache hit rate, cache miss rate, execution time, etc.) so that at least one of the minimum quota and the maximum quota can be varied to affect subsequent performance for the associated entity. If it is determined that a cache hit value is below a predetermined level for one of the entities, the minimum quota can be increased for the corresponding entity. Similarly, if it is determined that a cache miss penalty is above a predetermined level for one of the entities, the maximum quota for the corresponding entity can be decreased. In some arrangements there are multiple levels of quotas.

The relationships of the occupancy value compared to quotas/thresholds can be encoded into an n-bit compliance value by comparing a number of lines specified by the occupancy value with the minimum quota and the maximum quota for the entity. The occupancy values for each entity can be encoded in an n-bit code stored in a compliance table. The cache replacement algorithm can read the compliance values for entities in the compliance table and compare those compliance values to select cache lines to be replaced. The cache replacement algorithm selects a cache line to replace (e.g., a victim, etc.) by taking into account, in prioritized order, whether an entity: occupies a number of cache lines substantially exceeding its corresponding maximum quota, occupies a number of cache lines exceeding it corresponding maximum quota, occupies a number of cache lines less than its corresponding maximum quota and more than its corresponding minimum quota, occupies a number of cache lines less than its minimum quota, and occupies a number of cache lines substantially less than its minimum quota.

If the cache replacement algorithm is not able to identify a cache line to be replaced, a default method such as random or least recently used cache line can be used to replacement selection. If a cache replacement algorithm identifies multiple cache lines eligible for replacement, a default method such as random or least recently used can be used to select which cache line among those selected to replace.

In another aspect, performance of a plurality of entities in a processor system is monitored. Each entity has an associated maximum quota specifying a maximum number of cache lines that the entity should occupy and an associated minimum quota specifying a minimum number of cache lines that the entity should occupy. A number of cache lines occupied by the entity are also determined. Thereafter, one or more of the maximum quota or the minimum quota for an entity is dynamically adjusted if such entity is performing outside desired performance criteria. A cache replacement algorithm is used to replace cache lines in the cache memory. The cache replacement algorithm selects cache lines to be replaced based on a number of cache lines occupied by an entity in relation to its associated maximum quota and/or its associated minimum quota.

In a further aspect, systems and methods for controlling execution of entities using cache memory within a processor system are provided. With such systems and methods, performance of a plurality of entities are monitored. Thereafter, based on the monitoring, at least one of a minimum cache quota and a maximum cache quota are selectively adjusted.

Articles of manufacture are also described that comprise computer executable instructions permanently stored on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein.

The subject matter described herein provides many advantages. For example, overall entity performance can be more effectively controlled by specifying minimum and maximum cache quotas and allowing for the dynamic adjustment of both and by replacing cache lines based on cache occupancy values and/or compliance values.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter provides cache quotas replacement policies that select vacating cache locations in order to effectively control the amount of cache space a entity may occupy within a processor system. The caching techniques utilized herein can be characterized as set associative caching, which in turn is sometimes described as a compromise between a direct mapped cache and a fully associative cache where each address is mapped to a certain set of cache locations. A set of cache locations utilized by a particular entity is sometimes referred to as a working set. The address space can be divided into blocks of $2^m$ bytes (i.e., the cache line size), discarding the bottom m address bits. An "n-way set associative" cache with S sets has n cache locations in each set. Block b can be mapped to set "b mod S" and may be stored in any of the n locations in that set with its upper address bits stored in the tag. To determine whether block b is in the cache, set "b mod S" the upper address bits are searched associatively in the tag. A tag as used herein can be characterized as an object that stores status (state) information and the entity ID for each cache line. Stated differently, each cache line can have an associated tag which stores upper address bits, status, ID.

As used herein, the term "entity" or "entity" (unless otherwise noted) refers to tasks, groups of tasks, threads, groups of threads, state machines, groups of state machines, virtual machines, groups of virtual machines and/or other software or hardware requiring cache. A task can be characterized as a set of instruction to be executed by the processor system. The entities can be instances of computer programs that are being executed, threads of execution such as one or more simultaneously, or pseudo-simultaneously, executing instances of a computer program closely sharing resources, etc. that execute within one or more processor systems (e.g., microprocessors, etc.) or virtual machines such as virtual execution environments on one or more processors. A virtual machine (VM) can be characterized as a software implementation of a machine (computer) that executes programs like a real machine. In some implementations, the entities can be state machines such as DMA controllers and the collection of commands for such state machines (e.g., DMA channels).

As will be described further, the current subject matter can be implemented to be upwards compatible with existing cache replacement policies such as LRU or Random. If no quotas are set by the software or a decision among entities with similar relationships to their quotas is required or no meaningful decision based on quotas can be reached, the replacement policy reverts to the default policy such as LRU or Random.

The cache quotas techniques described herein can be implemented in hardware and they can be used as replacements to conventional cache circuits (which can be the only part of the cache hardware affected) within processor systems. The current subject matter can ensure that the cache controller speed of operation is not affected by the new circuits. Examples of processor systems that can utilize the current subject matter are described and illustrated in U.S. Pat. Pub. No. 2009/0055829 and U.S. patent application Ser. No 13/072,596 (filed Mar. 25, 2011) claiming priority to U.S. Pat. App. Ser. No. 61/341,069, the contents of all three applications are hereby fully incorporated by reference.

A large portion of program execution timing variability comes from cache hit variability and high cache miss penalties. In some cases, such variability cannot be mitigated by just increasing the run time and/or clock speed. As a result, real-time deadlines or desired response times may be missed when multiple applications are sharing the cache space.

Figure 1:
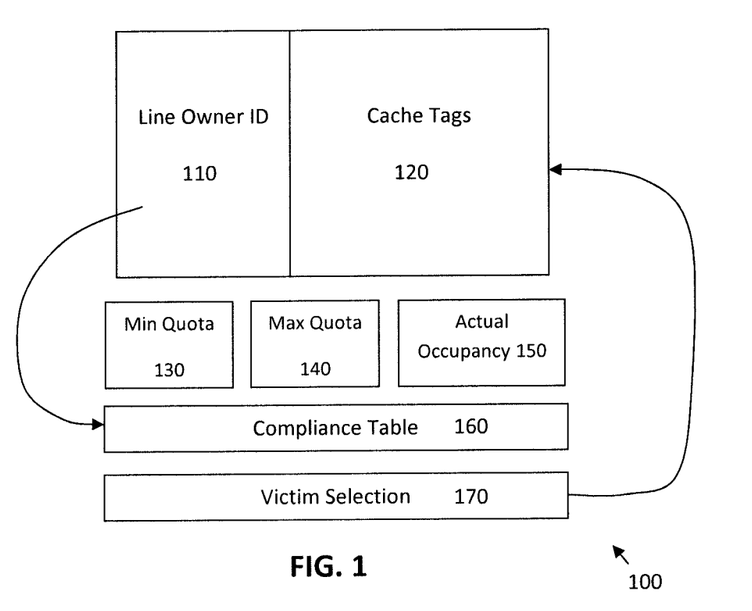
FIG. 1 is a general block diagram of a processor cache system.

FIG. 1 is a block diagram illustrating a processor cache system 100 having the following components: cache line owner identification (ID) 110 (the cache line is the object that includes a tag and storage for data), address tag/state 120, minimum quota 130, maximum quota 140, actual occupancy 150, compliance table 160, and victim selection 170. With such an arrangement, the amount of cache space a entity can occupy can be controlled dynamically by adjusting one or more of the cache quotas 130, 140. The quotas can be defined as a minimum/maximum number of cache locations (sometimes referred to herein as "lines" or "cache lines") an entity being executed by a processor system is guaranteed to be able to occupy and/or cannot exceed. As used herein, the term "guarantee" in relation to cache quotas references a targeted number of cache lines (whether minimum or maximum) to be allocated to an entity and does not necessarily require an absolute guarantee of cache line occupancy. For example, aliasing as well as minimum quota oversubscription are sometimes difficult/impossible to avoid. Similarly, under subscription of the cache can allow occupancy to above maximum quota. If the goal is to guarantee that a working set (e.g., an amount of cache required for the instructions and/or data for the entity to execute properly) for the entity remains in the cache, including when the entity is swapped out (not running), the minimum quota 130 can be established for the working set. As with conventional cache processor systems, each location in main memory and in a cache has an index which is a unique number referencing such location. Each location has a tag that contains the index of the data in the main memory that has been cached.

The maximum quota 140 can be used to provide performance isolation between entities and/or prevent some entities from excess use (e.g., hogging, etc.) of the cache. The maximum quota 140 can also be used to free up some cache space (by reducing the maximum quota) to allow other entities to expand (by increasing their maximum quota) their share of the cache. In some cases, a scheduler is utilized in order to prioritize execution of entities and/or to define schedules for execution of the entities (e.g., execution initiation, execution termination, etc.). In such cases, the current arrangement provides another mechanism to control the "execution speed" of an entity, by accelerating those entities which are falling behind (i.e., entities that are likely to be finalized subsequent to their corresponding execution deadline) while decelerating entities that are ahead (i.e., entities that are likely to be finalized prior to their corresponding execution deadline, etc.). This is dictated by the finite size of the corresponding cache. The cache occupancy quota method (as described herein) can keep track of how many cache lines each entity occupies and it can decide which line, within a set, will be replaced based on the line owner's (entity) Min/Max settings (as defined in the minimum quota 130 and the maximum quota 140), both of which can be dynamically adjusted at run time.

Cache quotas can effectively partition the cache dynamically amongst entities and groups of entities, which in turn can control cache misses. Cache misses occur when the data the processor access cache while executing an entity that is not presently in cache. These accesses may be instruction fetches, data reads or writes. The current cache replacement algorithm can control the amount of cache space an entity is allowed/guaranteed to have and therefore the cache miss rate is controlled. More cache can result in fewer cache misses.

Cache space isolation (i.e., a guarantee of a certain amount of cache space for the entity to respond/function accordingly, etc.) can also be used to assist with hardware convergence. Hardware convergence, in this regard, refers to reducing the number of processors by consolidating entities in fewer processors and/or utilizing one or more processors in a common system as opposed to multiple computer systems. One of the problems is that there can be real-time entities mixed with non-real time entities in the same processor, and such entities can require a guaranteed response time. A major part of the response time is to guarantee data/instructions is in the cache. Without such a guarantee, real-time entities cannot be intermingled with non-real-time entities.

Cache occupancy quotas can be allocated to individual entities (for critical code) or to groups of entities (sometimes referred to herein as "cache groups") to limit the size of the implementation hardware. Hardware required to implement the cache replacement algorithm increases with the number of entities. To limit an increase in a number of entities (and thus limiting the hardware size/requirements), entities can be grouped such that there is one entry for multiple entities within a particular group.

The effectiveness of the cache quota replacement technique, as described herein, can depend in part, on the number of sets a set-associative cache contains. With more sets, there are more options to choose from as a line replacement candidate (which can be defined by the victim selection 170).

With reference again to FIG. 1, additional information can be added to the tag memory to include the ID 110 to which the entity(s) belongs. This number can be uniquely associated with an entity. Associated with each ID, there is a Max Quota 140 specifying the max cache lines the entity cannot exceed (unless the cache is underutilized), a Min Quota 130 specifying the minimum cache lines the entity is guaranteed to be able to occupy, and an Actual Occupancy 150 indicating the actual number of lines the entity occupies. These three values can be encoded and stored in the compliance table 160. When a miss occurs, the data in the compliance table 160 is used to determine the "victim" (which is then selected in the victim selection 170), namely the cache location where new data will be stored.

Figure 2:
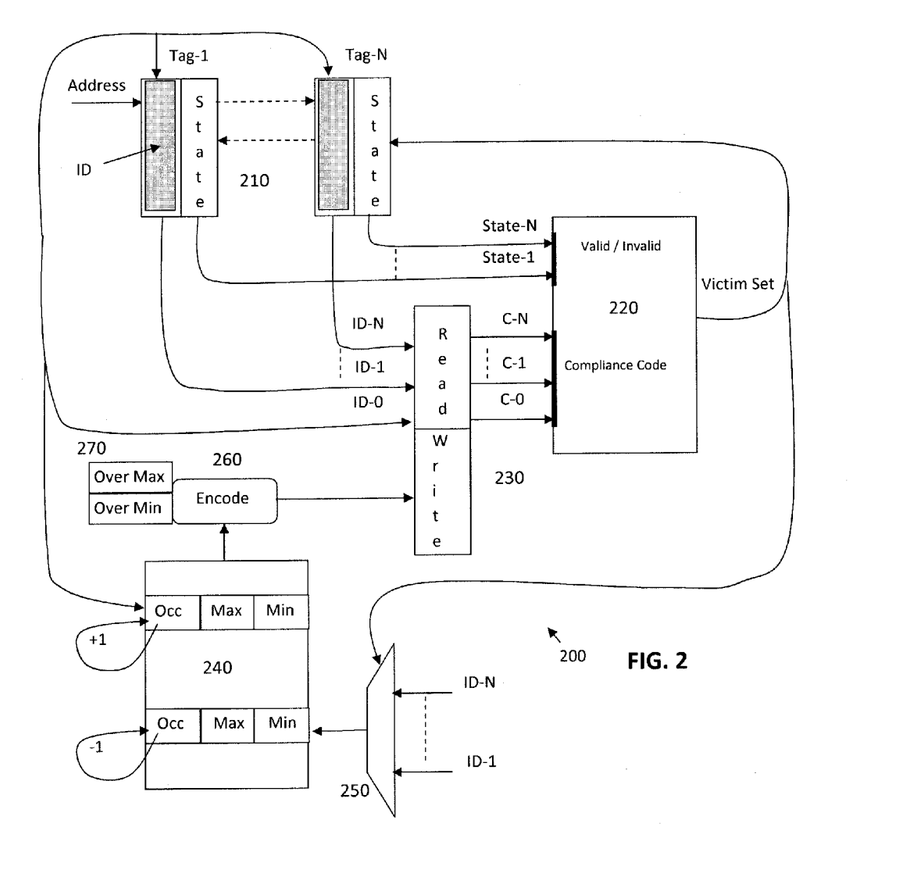
FIG. 2 is a detailed block diagram of a processor cache system.

FIG. 2 is a detailed block diagram of a processor cache system 200. It will be appreciated that the current subject matter is applicable to a wide variety of processor cache systems. N sets are illustrated with individual entity or a group in which an entity is a member being identified by the corresponding ID. ID-0 is the ID associated with a currently running entity while ID-1 to N identifies groups owning the respective cache lines. In FIG. 2, there are cache tags 210 (1 to N for an N-set associative Cache), victim selection logic 220, a compliance table 230 (N+1 read ports, 1 write port, 2-bit output), a quota table 240 (2 read ports—victim, new owner), a MUX 250 that selects the victim ID, logic 260 to encode the result of comparing the Occupancy to Min and Max Quota Values and threshold registers 270 into one or more N-bit values (as described in further detail below).

The cache tags 210 can contain both an upper address of the data residing there and a state of the associated cache line (e.g., valid, invalid, etc.). The tag state can be augmented with the ID of the entity to which the data residing there is associated. The number of bits for the ID field is implementation-dependent (e.g., 5, 8 bits for 32, 256 IDs respectively). IDs can be reclaimed, to be utilized by a new group, when the corresponding group is no longer active in the processor cache system 200.

When a cache access (read or write) results in a cache miss, indicated by the associated address in the tag for each set not matching the cache access address, a new location for the missing data needs to be selected. The compliance table 230 can be indexed by the IDs from all tags that have valid entries. The content of the table can be a 2-bit value indicating the level of compliance of the ID owner of that cache location to the current quotas. As used herein, "over-exceeding" a quota can be characterized as exceeding a maximum quota and a maximum threshold over the maximum quota and "exceeding" a quota can be characterized as exceeding the quota but being below such maximum threshold. As used herein, "greatly under-achieving" a quota can be characterized as being less than a minimum quota and a minimum threshold below the minimum quota and "under-achieving" a quota can be characterized as being less than the minimum quota but greater than the minimum threshold.

Max quota compliance (2 bits) can comprise:
ID over-exceeds its max quota/has far more lines than its max quota
ID exceeds its max quota/has more lines than its max quota
ID complies with its max quota/has no more lines than its max quota
Min quota compliance (2 bits) can comprise:
ID greatly under-achieves its min quota/has far fewer lines than its min quota
ID under-achieves its min quota/has fewer lines than its min quota ID complies with its min quota/has at least the number of lines specified by the min quota To reduce the size of the hardware, a single bit compliance code can be used as shown below:

ID over-exceeds its max quota/has far more lines than its max quota

ID exceeds its max quota/has more lines than the max quota

ID under exceeds its min quota/has fewer lines than min quota

ID in compliance/has fewer lines than the max quota and more lines than min quota Compliance codes (C-0, C-1 . . . C-N, etc.) for all IDs in the tags indexed by the lower bits of the address which resulted in a cache miss can be read out simultaneously (N read ports) and supplied to the victim selection logic 220 which determines the set where the selected victim resides. The set selection can be provided to the cache control logic to write the ID of the missing address in the victim's tag position as the new owner of that location. The valid bit can also be set.

The victim (i.e., the cache location to be replaced, etc.) may be selected in a decreasing priority order is:
1. Unoccupied cache line
2. Over-exceeds max quota
3. Exceeds max quota
4. In compliance with both max quota and min quota
5. Under-achieves min quota
6. Greatly under-achieves min quota 7. Default selection method such as LRU or Random.

It will be appreciated that a subset of the items above can be used for determining the victim.

At the same time, the ID of the victim can be selected by the MUX 250 and supplied to the quota table 240 which can contain an entry for each ID in the system 200. For example, if the ID field has 5 bits, providing for 32 IDs, the quota table 240 will have 32 entries.

A management module can set table entries in the quota table 240. Each table entry data in the quota table 240 can include:
1. Occupancy (Occ) level: The number of cache lines each group or entity associated with the ID owns.
2. Maximum (Max) Quota: The maximum number of cache locations the group or entity associated with the ID is allowed to occupy.
3. Minimum (Min) Quota: The minimum number of cache locations the group or entity associated with the ID is guaranteed to occupy.

In one implementation, there can be two registers 270 set by software to determine the threshold for "over-exceeding the max quota" and "greatly under-achieving the min quota".

The Occupancy level field can be incremented for the ID owner of the newly-fetched cache data and decremented for the ID of the victim. After that, the encode logic 260 can use the new occupancy levels of the new owner and the victim and the threshold registers 270 to generate new compliance codes which can be stored in the compliance table 230 at the locations corresponding to the new owner and the victim.

The information in the quota table 240 should, in most cases, be sufficient to select the victim. The compliance table 230 (as illustrated) can be characterized as an optimization aimed at reducing hardware size and improving circuit timing as it has only 4 bits of information albeit being N-multi-ported. Applying the same level of multi porting to the quota table 240 could result in a large and slow structure.

The victim selection can be in the time critical path but can be sped up by the compliance table 230 small data width. Updating the compliance table 230 through the MUX 250, quota table 240 and encoding Logic 260 is not time-critical as it only needs to be done before the next cache miss occurs (or within the processing pipeline).

Below is an example of victim selection algorithm to be implemented by victim selection logic 220.

---

Pick an un-occupied location (invalid)
Else:
  Pick a location with corresponding ID that over-exceeds its max quota
  Else:
    Pick a location with corresponding ID that exceeds its max quota
    Else:
      Pick a location with corresponding ID that under-achieves its min quota
      Else:
        Pick a location with corresponding ID that greatly under-achieves its min quota
        Else:
          Pick location based on the default method:
LRU or Random

---

The above described victim selection algorithm attempts to take cache locations away from the worst offenders of their pre-set quotas. Exceeding the max quota is the worst "offense" while exceeding the min quota is not an "offense" but it means the respective entitiy(s) associated with ID has more than the minimum guaranteed number of locations and therefore can afford to donate/surrender one or more.

If none of the cache lines associated IDs qualify as donor, the selection of the victim can be done by the default mechanism of the cache controller (e.g., LRU, Random, etc.). Similarly, if there are multiple cache lines that qualify as a "victim" (i.e., there is a "tie"), a default mechanism, such as LRU or Random techniques, can be used to select a victim amongst such cache lines. Setting the max quota equal to the total number of locations in the cache and the min Quota to zero will force the use of a default selection under all conditions effectively turning the quota-based selection mechanism off in the above example.

In one variation, the two "quota threshold" registers 270, one for max quota and the other for min quota, can be set by software to any arbitrary values to set the boundary between "exceeding" and "over-exceeding" as a percentage of the individual quotas. As multiplication operations may be expensive to implement, the multiplier can be restricted to a power of 2. Only two calculation (the new owner and the victim) compliance codes need to be generated for each cache miss and may be calculated sequentially using the same hardware.

In another variation, a threshold value specific to each quota can be required (instead of a unique multiplier) and such threshold values can be stored along with the max/min quota values in the quota table 240.

The main use of the cache quota can be to influence the cache miss ratio (or cache miss rate) for individual entities, or groups of entities, identified by their IDs. The min quota results in guaranteeing a minimum hit ratio while the max quota limits maximum occupancy (which is often correlated to a higher hit ratio). In some cases a "zero" miss ratio for a certain entity and memory region can be required. The base quota algorithm deals with "number of locations" but not where those locations are. In simple cases where all the memory locations "touched" by an entity need to stay in the cache, the min quota can be set equal to the number of locations. In the rare case when all IDs in the cache corresponding to the cache miss address have occupancy levels below their min quota and therefore none is a candidate for victim selection, the above algorithm can pick the victim based on LRU or Random method effectively making the victim own fewer locations than its guaranteed minimum. The likelihood of such occurrences can be reduced by limiting the amount of "guaranteed number of locations" for an entity.

Cache occupancy can include mapping virtual memory, memory management techniques allowing tasks to utilize virtual memory address space(s) which may be separate from physical address space(s), to physical memory. The physical memory in effect acts as a cache allowing a plurality of entities to share physical memory wherein the total size of the virtual memory space(s) may be larger than the size of physical memory, or larger than the physical memory allocated to one or more entities, and thus the physical memory, and/or a portion thereof, acts as a "cache". Entity physical memory occupancy can be managed as described elsewhere and as in the co-pending applications.

Figure 3:
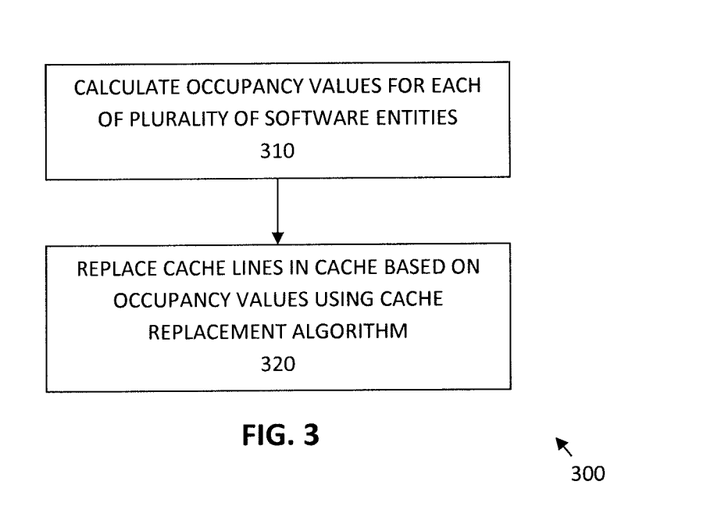
FIG. 3 is a process flow diagram illustrating a method for controlling processor cache memory occupancy.

FIG. 3 is a process flow diagram illustrating a method 300 for controlling processor cache memory within a processor system. A cache occupancy value is calculated, at 310, for each of a plurality of entities executing in the processor system. The cache occupancy value for the entity can be calculated based on the number of cache lines in the cache memory having identifiers associated with the entity Thereafter, at 320, cache lines in the cache memory are replaced, using a cache replacement algorithm, in connection with the subsequent execution of entities. The cache replacement algorithm uses the occupancy values in order to determine which cache lines to replace.

Various aspects of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A method comprising:
monitoring performance of a plurality of entities in a processor system, each entity having an associated maximum quota specifying a maximum number of cache lines that the entity should occupy and an associated minimum quota specifying a minimum number of cache lines that the entity should occupy;
monitoring, for each entity, a number of cache lines occupied by the entity;
dynamically adjusting one or more of the maximum quota or the minimum quota for a entity if such entity is performing outside desired performance criteria; and
replacing, using a cache replacement algorithm, cache lines in the cache memory, the cache replacement algorithm selecting cache lines to be replaced based on an number of cache lines occupied by a entity in relation to its associated maximum quota and/or its associated minimum quota.

2. A method as in claim 1, wherein monitoring performance comprises: monitoring at least one of cache hit rate, a cache hit value, a cache miss rate, and a cache miss penalty, for cache accesses by an entity.

3. A method as in claim 1, wherein the entities are each selected from a group comprising: a single task, a group of tasks, a thread, a group of threads, a single state machine, a group of state machines, a single virtual machine, and a group of virtual machines, and any combination thereof.

4. A method as in claim 1, wherein each entity has an associated occupancy profile.

5. A method as in claim 4, wherein the occupancy profile comprises the minimum quota and the maximum quota.

6. A method as in claim 1, wherein the monitored performance is based on at least one of: cache hit values and cache miss penalty.

7. A method as in claim 6, further comprising:
determining that a cache hit value is below a predetermined level for one of the entities; and
increasing the minimum quota for the entity having the cache hit value below the predetermined level.

8. A method as in claim 6, further comprising:
determining that a cache miss penalty is above a predetermined level for one of the entities; and
decreasing the maximum quota for the entity having the cache hit value above the predetermined level.

9. A method as in claim 1, further comprising:
encoding, for each entity, a corresponding occupancy value into an n-bit compliance value by comparing a number of lines specified by the occupancy value with the minimum quota and the maximum quota for the entity.

10. A method as in claim 9, wherein the occupancy values for each entity are encoded in an N-bit code stored in a compliance table.

11. A method as in claim 10, wherein the cache replacement algorithm reads the compliance values for entities in the compliance table and compares those compliance values to select cache lines to be replaced.

12. A method as in claim 1, wherein the cache replacement algorithm selects a cache line to replace by taking into account, in prioritized order, whether an entity:
occupies a number of cache lines substantially exceeding its corresponding maximum quota,
occupies a number of cache lines exceeding its corresponding maximum quota,
occupies a number of cache lines less than its corresponding maximum quota and more than its corresponding minimum quota,
occupies a number of cache lines less than its minimum quota, and
occupies a number of cache lines substantially less than its minimum quota.

13. A method as in claim 1, further comprising:
replacing a randomly selected cache line if the cache replacement algorithm is not able to identify a cache line to be replaced.

14. A method as in claim 1, further comprising:
replacing a least recently used cache line if the cache replacement algorithm is not able to identify a cache line to be replaced and there is not an empty cache line.

15. A method as in claim 1, further comprising:
replacing a least recently used cache line if the cache replacement algorithm identifies multiple cache lines to be replaced and there is not an empty cache line.

16. A non-transitory computer program product storing instructions, which when executed by at least one data processor of at least one computing system, result in operations comprising:
monitoring performance of a plurality of entities in a processor system, each entity having an associated maximum quota specifying a maximum number of cache lines that the entity should occupy and an associated minimum quota specifying a minimum number of cache lines that the entity should occupy;
monitoring, for each entity, a number of cache lines occupied by the entity;
dynamically adjusting one or more of the maximum quota or the minimum quota for a entity if such entity is performing outside desired performance criteria; and
replacing, using a cache replacement algorithm, cache lines in the cache memory, the cache replacement algorithm selecting cache lines to be replaced based on an number of cache lines occupied by a entity in relation to its associated maximum quota and/or its associated minimum quota.

17. A computer program product as in claim 16, wherein the entities are each selected from a group comprising: a single task, a group of tasks, a thread, a group of threads, a single state machine, a group of state machines, a single virtual machine, and a group of virtual machines, and any combination thereof.

18. A computer program product as in claim 16, wherein each entity has an associated occupancy profile.

19. A computer program product as in claim 18, wherein the occupancy profile comprises the minimum quota and the maximum quota.

20. A computer program product as in claim 16, wherein the monitored performance is based on at least one of: cache hit values and cache miss penalty.

21. A computer program product as in claim 20, wherein the operations further comprise:
determining that a cache hit value is below a predetermined level for one of the entities; and
increasing the minimum quota for the entity having the cache hit value below the predetermined level.

22. A computer program product as in claim 20, wherein the operations further comprise:
determining that a cache miss penalty is above a predetermined level for one of the entities; and
decreasing the maximum quota for the entity having the cache hit value above the predetermined level.

23. A computer program product as in claim 16, wherein the operations further comprise:
encoding, for each entity, a corresponding occupancy value into an n-bit compliance value by comparing a number of lines specified by the occupancy value with the minimum quota and the maximum quota for the entity.

24. A computer program product as in claim 23, wherein the occupancy values for each entity are encoded in an N-bit code stored in a compliance table.

25. A computer program product as in claim 24, wherein the cache replacement algorithm reads the compliance values for entities in the compliance table and compares those compliance values to select cache lines to be replaced.

26. A computer program product as in claim 16, wherein the cache replacement algorithm selects a cache line to replace by taking into account, in prioritized order, whether an entity:
occupies a number of cache lines substantially exceeding its corresponding maximum quota,
occupies a number of cache lines exceeding its corresponding maximum quota,
occupies a number of cache lines less than its corresponding maximum quota and more than its corresponding minimum quota,
occupies a number of cache lines less than its minimum quota, and
occupies a number of cache lines substantially less than its minimum quota.

27. A computer program product as in claim 16, wherein the operations further comprise:
replacing a randomly selected cache line if the cache replacement algorithm is not able to identify a cache line to be replaced.

28. A computer program product as in claim 16, wherein the operations further comprise:
replacing a least recently used cache line if the cache replacement algorithm is not able to identify a cache line to be replaced and there is not an empty cache line.

29. A computer program product as in claim 16, wherein the operations further comprise:
replacing a least recently used cache line if the cache replacement algorithm identifies multiple cache lines to be replaced and there is not an empty cache line.

30. A system comprising:
at least one data processor; and
memory storing instructions, which when executed by the at least one data processor, result in operations comprising:
monitoring performance of a plurality of entities in a processor system, each entity having an associated maximum quota specifying a maximum number of cache lines that the entity should occupy and an associated minimum quota specifying a minimum number of cache lines that the entity should occupy;
monitoring, for each entity, a number of cache lines occupied by the entity;
dynamically adjusting one or more of the maximum quota or the minimum quota for a entity if such entity is performing outside desired performance criteria; and
replacing, using a cache replacement algorithm, cache lines in the cache memory, the cache replacement algorithm selecting cache lines to be replaced based on an number of cache lines occupied by a entity in relation to its associated maximum quota and/or its associated minimum quota.

31. A system as in claim 30, wherein the entities are each selected from a group comprising: a single task, a group of tasks, a thread, a group of threads, a single state machine, a group of state machines, a single virtual machine, and a group of virtual machines, and any combination thereof.

32. A system as in claim 30, wherein each entity has an associated occupancy profile.

33. A system as in claim 32, wherein the occupancy profile comprises the minimum quota and the maximum quota.

34. A system as in claim 30, wherein the monitored performance is based on at least one of: cache hit values and cache miss penalty.

35. A system as in claim 34, wherein the operations further comprise:
- determining that a cache hit value is below a predetermined level for one of the entities; and
- increasing the minimum quota for the entity having the cache hit value below the predetermined level.

36. A system as in claim 34, wherein the operations further comprise:
- determining that a cache miss penalty is above a predetermined level for one of the entities; and
- decreasing the maximum quota for the entity having the cache hit value above the predetermined level.

37. A system as in claim 30, wherein the operations further comprise:
- encoding, for each entity, a corresponding occupancy value into an n-bit compliance value by comparing a number of lines specified by the occupancy value with the minimum quota and the maximum quota for the entity.

38. A system as in claim 37, wherein the occupancy values for each entity are encoded in an N-bit code stored in a compliance table.

39. A system as in claim 38, wherein the cache replacement algorithm reads the compliance values for entities in the compliance table and compares those compliance values to select cache lines to be replaced.

40. A system as in claim 30, wherein the cache replacement algorithm selects a cache line to replace by taking into account, in prioritized order, whether an entity:
- occupies a number of cache lines substantially exceeding its corresponding maximum quota,
- occupies a number of cache lines exceeding its corresponding maximum quota,
- occupies a number of cache lines less than its corresponding maximum quota and more than its corresponding minimum quota,
- occupies a number of cache lines less than its minimum quota, and
- occupies a number of cache lines substantially less than its minimum quota.

41. A system as in claim 30, wherein the operations further comprise:
- replacing a randomly selected cache line if the cache replacement algorithm is not able to identify a cache line to be replaced.

42. A system as in claim 30, wherein the operations further comprise:
- replacing a least recently used cache line if the cache replacement algorithm is not able to identify a cache line to be replaced and there is not an empty cache line.

43. A system as in claim 30, wherein the operations further comprise:
- replacing a least recently used cache line if the cache replacement algorithm identifies multiple cache lines to be replaced and there is not an empty cache line.

\* \* \* \* \*

UNITED STATES PATENT AND TRADEMARK OFFICE
CERTIFICATE OF CORRECTION

PATENT NO. : 8,677,071 B2
APPLICATION NO. : 13/072529
DATED : March 18, 2014
INVENTOR(S) : Gary Allen Gibson et al.

Page 1 of 1

It is certified that error appears in the above-identified patent and that said Letters Patent is hereby corrected as shown below:

Title page, should read,

\*\*(74) Attorney, Agent, or Firm – Mintz, Levin, Cohn, Ferris, Glovsky and Popeo, P.C.\*\*

Signed and Sealed this
Tenth Day of June, 2014

Michelle K. Lee
*Deputy Director of the United States Patent and Trademark Office*